US012081938B2

(12) United States Patent
Lembacher et al.

(10) Patent No.: US 12,081,938 B2
(45) Date of Patent: Sep. 3, 2024

(54) LOUDSPEAKER, MOBILE DEVICE AND METHOD OF MANUFACTURING A LOUDSPEAKER

(71) Applicant: SSI New Material (Zhenjiang) Co., Ltd., Zhenjiang (CN)

(72) Inventors: Christian Lembacher, Gramatneusiedl (AT); Christoph Schmauder, Vienna (AT); Gordon Schriefer, Vienna (AT)

(73) Assignee: SSI New Material (Zhenjiang) Co., Ltd., Zhenjiang (CN)

( * ) Notice: Subject to any disclaimer, the term of this patent is extended or adjusted under 35 U.S.C. 154(b) by 0 days.

(21) Appl. No.: 18/214,694

(22) Filed: Jun. 27, 2023

(65) Prior Publication Data
US 2023/0345171 A1 Oct. 26, 2023

Related U.S. Application Data

(63) Continuation of application No. 16/307,141, filed as application No. PCT/CN2017/087127 on Jun. 5, 2017, now Pat. No. 11,729,545.

(60) Provisional application No. 62/346,278, filed on Jun. 6, 2016.

(51) Int. Cl.
*H04R 1/28* (2006.01)
*C08J 9/00* (2006.01)
*H04R 1/02* (2006.01)

(52) U.S. Cl.
CPC ............ *H04R 1/288* (2013.01); *C08J 9/0066* (2013.01); *H04R 1/025* (2013.01); *H04R 1/2803* (2013.01); *H04R 1/2807* (2013.01); *H04R 1/2819* (2013.01); *H04R 1/2888* (2013.01); *H04R 2499/11* (2013.01)

(58) Field of Classification Search
CPC .... H04R 1/025; H04R 1/2803; H04R 1/2807; H04R 1/2819; H04R 1/2876; H04R 1/288; H04R 1/2888; H04R 2499/11; C08J 9/0066
See application file for complete search history.

(56) References Cited

U.S. PATENT DOCUMENTS

2009/0245562 A1* 10/2009 Saiki ................... H04R 1/2803
                                                     381/345
2013/0341118 A1* 12/2013 Papakyriacou .......... H04R 1/02
                                                     181/284
2016/0309254 A1* 10/2016 Lembacher .......... H04R 1/2803

* cited by examiner

*Primary Examiner* — Huyen D Le
(74) *Attorney, Agent, or Firm* — Dykema Gossett PLLC

(57) ABSTRACT

A loudspeaker comprises an enclosure, at least one dynamic driver mounted in the enclosure, and at least one porous monolithic block. The at least one porous monolithic block comprises a plurality of pores and is mounted within the enclosure.

3 Claims, 3 Drawing Sheets

LOUDSPEAKER, MOBILE DEVICE AND METHOD OF MANUFACTURING A LOUDSPEAKER

PRIORITY

This patent application claims priority from U.S. patent application Ser. No. 16/307,141, filed Dec. 5, 2018, which is a U.S. National Stage application of International Application No. PCT/CN2017/087127, filed Jun. 5, 2017, which claims priority to U.S. Provisional application No. 62/346,278, filed Jun. 6, 2016, the disclosure of each of which are incorporated herein, in their entirety, by reference.

BACKGROUND OF THE INVENTION a. Technical Field

The invention relates to a loudspeaker and to a method of manufacturing a loudspeaker. The invention also relates to a mobile device, such as a mobile phone, comprising a loudspeaker.

b. Background Art

European patent No. 2 424 270 B1 discloses a loudspeaker which comprises an enclosure and a dynamic driver mounted in the enclosure. The enclosure is filled with a zeolite material. Filling the enclosure with the zeolite material results in in an apparent virtual enlargement of the volume defined by the enclosure, i.e. results in increasing the effective volume of the enclosure. The zeolite material comprises grains having an average grain size in a range between 0.2 and 0.9 mm and having a plurality of zeolite particles adhered together by means of a binder. The zeolite particles comprise pores and have a silicon to aluminum mass ration of at least 200.

SUMMARY OF THE INVENTION

It is an object of the present invention to provide a loudspeaker comprised of an enclosure and a dynamic driver mounted in the enclosure, which loudspeaker can be manufactured more easily.

The object of the invention is achieved by means of a loudspeaker, comprising an enclosure; at least one dynamic driver mounted in the enclosure; and at least one porous monolithic block mounted within the enclosure.

A further aspect of the invention relates to a method of manufacturing the loudspeaker according to the invention, comprising the steps of:
  providing a plurality of particles;
  producing the at least one porous monolithic block utilizing the plurality of particles; and
  mounting the porous monolithic block into the enclosure.

Another aspect of the invention relates to a mobile device comprising a loudspeaker according to the invention. The mobile device is, for instance, a mobile telephone.

Yet another aspect of the invention relates to a method of producing the mobile device according to the invention, comprising the steps of:
  providing a plurality of particles;
  producing the at least one porous monolithic block; and
  mounting the porous monolithic block into the enclosure.

The loudspeaker comprises the enclosure. The enclosure is preferably a sealed enclosure. Sealed loudspeaker enclosures are also referred to as closed enclosures.

The loudspeaker comprises at least one dynamic driver. Dynamic drivers per se are known to the skilled person. Dynamic drivers usually comprise a magnet system, a membrane movably mounted with respect to the magnet system, and a voice coil attached to the membrane. The magnet system comprises a magnet and the voice coil is operatively coupled with the magnet. When applying an electric signal to the voice coil, for instance, generated by an amplifier, then the membrane moves in response to the electric signal. The electric signal is, for instance, an electric voltage.

The enclosure provides a volume, specifically a back volume for the dynamic driver.

The loudspeaker further comprises the at least one porous monolithic block which is mounted within the enclosure. Thus, the at least one monolithic block is placed within the back volume for the dynamic driver.

Particularly, the porous monolithic block comprises a plurality of first pores. Preferably, the first pores have a size or diameter between 0.7 µm and 30 µm. Inter alia due to the first pores, the effective volume of the loudspeaker, i.e. the effective back volume for the dynamic driver is greater than the back volume for the dynamic driver without the at least one porous monolithic block, resulting in a potential increased sound quality of the entire loudspeaker. Particularly, due to the at least one porous monolithic block, a resonance frequency of the entire loudspeaker may be reduced compared to the resonance frequency of the entire loudspeaker without the at least one porous monolithic block. Therefore, it may be possible to reduce the overall volume of the loudspeaker or its enclosure, respectively, allowing to manufacture a relatively small loudspeaker especially having an improved or at least an acceptable sound quality when, for instance, using it for a mobile device, such as a mobile phone.

The porous monolithic block may be made from any suitable material. Preferably, the porous monolithic block comprises a zeolite material. The porous monolithic block may even consist of a zeolite material.

There may only a single porous monolithic block be mounted within the enclosure.

The enclosure may comprise a plurality of sub-enclosures acoustically coupled to each other and, thus, forming the enclosure. The at least one porous monolithic block may be mounted within at least one of the sub-enclosures. For instance, in one or at least in some of the sub-enclosures may be mounted each a single porous monolithic block. It may also be possible that one of the sub-enclosures is associated with the dynamic driver, i.e. that the dynamic driver is mounted in one of the sub-enclosures. Then, the sub-enclosure associated with the dynamic driver may be empty, while the at least one porous monolithic block is mounted within at least one of the remaining sub-enclosures.

The at least one porous monolithic block may be adapted to the shape of the enclosure or to the shape of the relevant at least one sub-enclosure, respectively. Particularly, the enclosure may have a contour and the at least one porous monolithic block may be mounted into the enclosure in a form-fit manner corresponding to the contour of the enclosure. If the enclosure comprises the plurality of sub-enclosures, then the at least one porous monolithic block may be mounted into the relevant sub-enclosure in a form-fit manner corresponding to the contour of that sub-enclosure.

The at least one porous monolithic block may be produced using a freezing casting method using a plurality of particles. Alternatively, the at least one porous monolithic block may be produced by a freezing foaming method using the plurality of particles, a sintering method using the plurality of particles, a ceramic foaming method using the plurality of particles, or a self-curing binding technique using the plurality of particles. The particles are preferably porous particles having second pores. Preferably, the size of the second pores may differ from the size of the first pores. The second pores may have a size or diameter of less than 1 nm. When utilizing the porous particles for producing the porous monolithic block, then the porous monolithic block may comprise the first pores and at least some of the second pores of the porous particles.

For the aforementioned methods, an appropriate mold may be used. The contour of the mold may correspond to the contour of the enclosure or to the relevant sub-enclosure, respectively, in order to produce a porous monolithic block having a shape adapted to the shape of the enclosure or the relevant sub-enclosure, or whose contour matches the contour of the enclosure or the relevant sub-enclosure for the form-fit mounting.

For instance, if the at least one porous monolithic block is made utilizing the freezing casting method, then the mold may at least partly be made from PTFE (Polytetrafluorethylen).

For instance, if the porous monolithic block is made utilizing the freezing foaming method, then the mold may at least partly be made from silicon rubber.

The particles or the porous particles may be any suitable organic or inorganic particles or porous particles, respectively. Preferably, the particles may be zeolite particles. The porous particles may be porous zeolite particles.

Especially, the porous particles form a zeolite powder. In particular, the zeolite particles are similar or equal those published by European application for patent No. 2 424 270 which is entirely incorporated by reference. The zeolite particles may have diameters of 10 µm in diameter or smaller.

Contrary to the method disclosed by European application for patent No. 2 424 270 the particles are not used for producing a plurality of grains, however, according to embodiments of the invention, to produce the at least one porous monolithic block.

The at least one porous monolithic block may be produced by providing an appropriate binder and a mold whose contour corresponds to the contour of the enclosure or the relevant sub-enclosure. Then, the binder and the plurality of particles may be mixed and this mixture may be filled into the mold. Then, the mold filled with the mixture of the plurality of particles and the binder is frozen in order to produce the at least one porous monolithic block. Then, the mold is removed from the porous monolithic block. This method basically describes a freezing casting method.

The at least one porous monolithic block may be produced by providing an appropriate binder and a mold whose contour corresponds to the contour of the enclosure or the relevant sub-enclosure. Then, the binder and the plurality of particles may be mixed and this mixture may be filled into the mold. Then, the ambient pressure around the mold filled with the mixture of the plurality of particles and the binder is reduced in order to produce the porous monolithic block. Then, the mold is removed from the porous monolithic block. This method basically describes a freezing foaming method.

The at least one porous monolithic block may be produced by providing an appropriate binder and a mold whose contour corresponds to the contour of the enclosure or the relevant sub-enclosure. Then, the binder and the plurality of particles may be mixed and this mixture may be filled into the mold. Then, the mold filled with the mixture of the plurality of particles and the binder is heated in order to produce the relevant porous monolithic block. During the heating, the binder burns at least partially. For example, two different kinds of binders may be used. One type of binder may be a temporary binder which burns completely or almost completely during the heating creating the first pores. Another type of binder may not burn during the heating. Then, the mold is removed from the porous monolithic block. This method basically describes a sintering method. Alternatively, the foaming of the plurality of particles can also be achieved by a ceramic foaming method.

The at least one porous monolithic block may be produced by providing a protein foam as a structuring agent, an appropriate binder and a mold whose contour corresponds to the contour of the enclosure or the relevant sub-enclosure. Then, the protein foam, the binder and the plurality of particles may be mixed and this mixture may be filled into the mold. Then, one has to wait until the mixture filled into the mold self-cures in order to produce the porous monolithic block. Then, the mold is removed from the porous monolithic block. This method basically describes a self-curing binding method.

DESCRIPTION OF THE PREFERRED EMBODIMENTS

Figure 1:
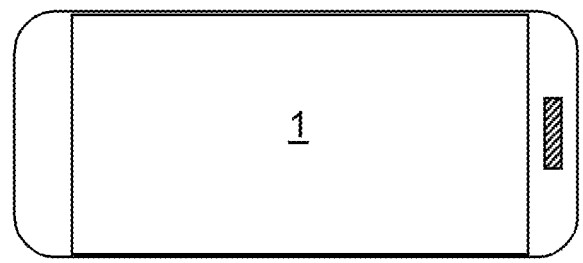
FIG. 1 is a top view of a mobile phone.

FIG. 1 shows a mobile phone 1 as an example of a mobile device. The mobile phone 1 may comprise a microphone, a wireless sender-receiver unit, an amplifier and a central processing unit connected to the wireless sender-receiver unit and to the amplifier.

Figure 2:
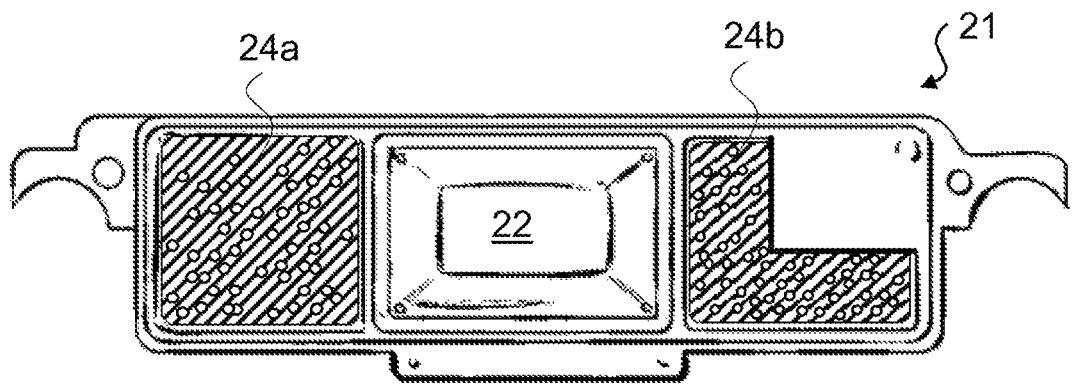
FIG. 2 is a top view of a loudspeaker comprising monolithic blocks, a dynamic driver and an enclosure which is shown open.

The mobile device 1 comprises a loudspeaker 21 which is shown in FIG. 2. The amplifier of the mobile phone 1 may be connected to the loudspeaker 21.

The loudspeaker 21 comprises at least one dynamic driver 22. Dynamic drivers per se are known to the skilled person. Dynamic drivers usually comprise a magnet system, a membrane movably mounted with respect to the magnet system, and a voice coil attached to the membrane. The magnet system comprises a magnet and the voice coil is operatively coupled with the magnet. When applying an electric signal to the voice coil, for instance, generated by the amplifier, then the membrane moves in response to the electric signal.

The loudspeaker 21 comprises an enclosure 23 and at least one porous monolithic block mounted within the enclosure 23. In particular, the loudspeaker 21 comprises a first porous monolithic block 24a and a second porous monolithic block 24b.

Figure 3:
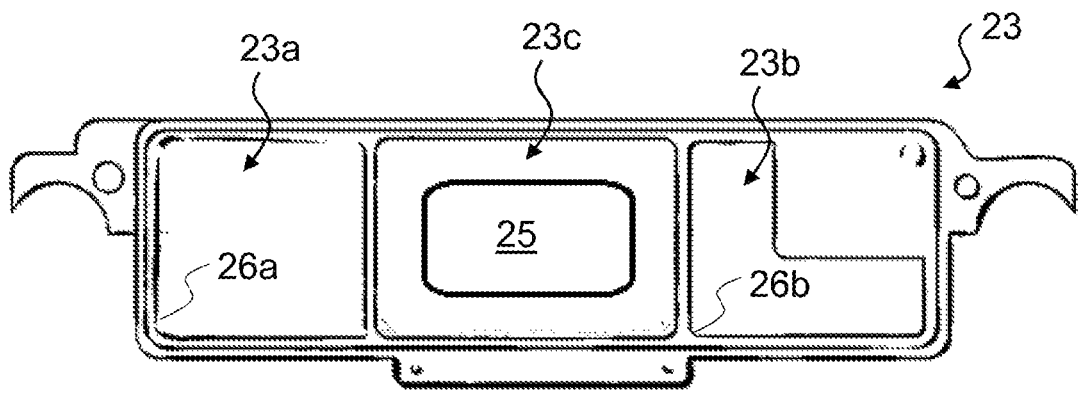
FIG. 3 is a top view of the opened enclosure.
Figure 4:
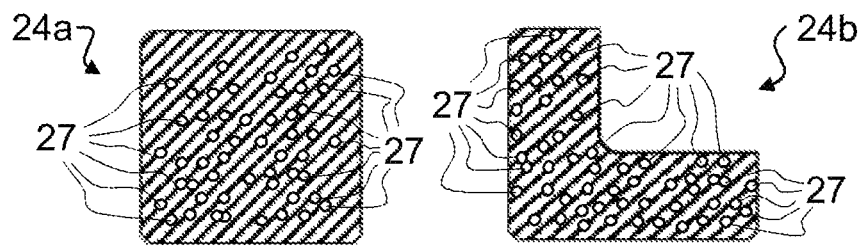
FIG. 4 are the monolithic blocks.

FIG. 2 shows in particular a top view of the of the loudspeaker 21 with its enclosure 23 opened. FIG. 3 shows a top view of the opened enclosure 23 and FIG. 4 shows the porous monolithic blocks 24a, 24b.

In the present embodiment, the enclosure 23 comprises a plurality of sub-enclosures, namely a first sub-enclosure 23a, a second sub-enclosure 23b, and a third sub-enclosure 23c. The sub-enclosures 23a, 23b, 23c are acoustically coupled to each other and form, as a result, the single enclosure 23 for the dynamic driver 22.

In the present embodiment, the enclosure 23 is a sealed enclosure. Sealed enclosures are also known as closed enclosures.

The dynamic driver 22 is mounted in the third sub-enclosure 23c. In particular, the third sub-enclosure 23c comprises an aperture 25 in which the dynamic driver 22 is mounted.

The porous monolithic blocks 24a, 24b are mounted within the enclosure 23. In the present embodiment, the first porous monolithic block 24a is mounted within the first sub-enclosure 23a, and the second porous monolithic block 24b is mounted within the second sub-enclosure 23b.

The first and second sub-enclosures 23a, 23b may be identical or, as shown in the figures, may differ from each other.

The porous monolithic blocks 24a, 24b each comprise first pores 27. Particularly, the first pores 27 have a diameter between 0.7 μm to 30 μm.

Preferably, the porous monolithic blocks 23a, 23b comprise each a zeolite material.

Due to the porous monolithic blocks 24a, 24b, the effective volume of the enclosure 23 is greater than the volume of the enclosure 23 without the porous monolithic blocks 24a, 24b.

Figure 5:
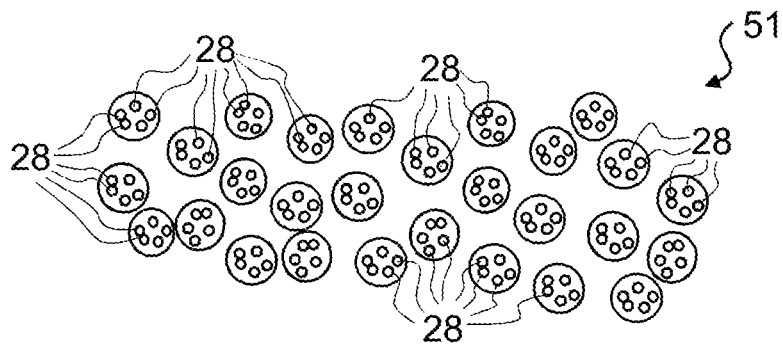
FIG. 5 is a plurality of particles.

The porous monolithic blocks 24a, 24b may be produced using a freezing casting method using a plurality of porous particles 51 shown in FIG. 5. Alternatively, the monolithic blocks 24a, 24b may be produced by a freezing foaming method using the plurality of porous particles 51, a sintering method using the plurality of porous particles 51, a ceramic foaming method using the plurality of porous particles 51, or a self-curing binding technique using the plurality of porous particles 51. The porous particles 51 comprise second pores 28. The size or diameter of the second pores 51 are preferably less than 1 nm.

Figure 6:
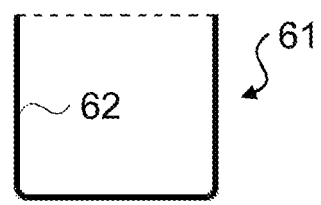
FIG. 6 is a mold.

For the aforementioned methods, an appropriate mold 61, as shown in FIG. 6, may be used. Particularly, the mold 61 is made from a material appropriate for the specific method. In particular, each porous monolithic block 24a, 24b may be made utilizing an individual mold 61.

For instance, if the porous monolithic blocks 24a, 24b are made utilizing the freezing casting method, then the mold 61 may at least partly be made from PTFE (Polytetrafluorethylen).

For instance, if the porous monolithic blocks 24a, 24b are made utilizing the freezing foaming method, then the mold 61 may at least partly be made from silicon rubber.

Preferably, the porous particles 51 are comprised or consist of a plurality of porous zeolite particles.

In the present embodiment, the shape of the first and second sub-enclosures 23a, 23b differ.

In particular, the shape of the porous monolithic block 24a, 24b are adapted to the shape of the relevant sub-enclosures 23a, 23b, i.e. the shape of the first porous monolithic block 24a is adapted to the shape of the first sub-enclosure 23a, and the shape of the second porous monolithic block 24b is adapted to the shape of the second sub-enclosure 23b. When using one of the aforementioned methods to produce the porous monolithic blocks 24a, 24b, then, for instance, the mold 61 can be adapted to the shape of the relevant sub-enclosure 23a, 23b.

The enclosure 23 may have a contour. More specifically, the surface of the enclosure 23 facing towards the porous monolithic blocks 24a, 24b may have the contour. Preferably, the porous monolithic blocks 24a, 24b are mounted into the enclosure 23 in a form-fit manner corresponding to the contour of the enclosure 23.

In the present embodiment, the first sub-enclosure 23a has a first contour 26a and the second sub-enclosure 23b has a second contour 26b. Preferably, the first porous monolithic block 24a is mounted into the first sub-enclosure 23a in a form-fit manner corresponding to the first contour 26a of the first sub-enclosure 23a, and the second porous monolithic block 24b is mounted into the second sub-enclosure 23b in a form-fit manner corresponding to the second contour 26b of the second sub-enclosure 23b.

When using one of the aforementioned methods to produce the porous monolithic blocks 24a, 24b, then, for instance, each porous monolithic block 34a, 24b is made using its specific mold 61. These molds 61 may preferably each have a contour 62 which corresponds to the contour 26a, 26b of the relevant sub-enclosure 23a, 23b.

Figure 7:
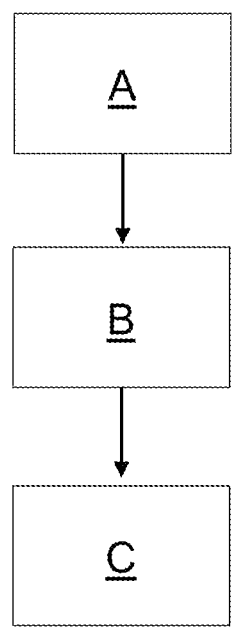
FIG. 7 is a flow chart.

FIG. 7 summarize, by means of a flow chart, embodiments how to manufacture the loudspeaker 21 and the mobile phone 1, respectively.

For manufacturing the loudspeaker 21 or the mobile device 1, the plurality of particles 51 may be provided, step A of the flow chart.

Then, the porous monolithic blocks 24a, 24b are produced by utilizing the plurality of particles 51, step B of the flow chart, particularly by means of one of the aforementioned methods and particularly by means of the mold 61.

Then, the porous monolithic blocks 24a, 24b are mounted into the enclosure 23, particularly into the first and second sub-enclosures 23a, 23b, step C of the flow chart.

If utilizing, for instance, the freezing casting method, then the porous monolithic blocks 24a, 24b may be made by providing an appropriate binder for a freezing casting method, and the mold 61 whose contour 62 corresponds to the contour 26a, 26b of the first and second sub-enclosure 23a, 23b. Then, the binder and the plurality of particles 51 may be mixed and this mixture may be filled into the mold 61. Then, the mold 61 filled with the mixture of the plurality of particles 51 and the binder is frozen in order to produce the relevant monolithic block 24a, 24b. Then, the mold 61 is removed from the porous monolithic block 24a, 24b.

If utilizing, for instance, the freezing foaming method, then the porous monolithic blocks may be made by providing an appropriate binder for a freezing foaming method, the mold 61 whose contour 62 corresponds to the contour 26a, 26b of the first and second sub-enclosure 23a, 23b. Then, the binder and the plurality of particles 51 may be mixed and this mixture may be filled into the mold 61. Then, the ambient pressure around the mold 61 filled with the mixture of the plurality of particles 51 and the binder is reduced in order to produce the relevant porous monolithic block 24a, 24b. Then, the mold 61 is removed from the porous monolithic block 24a, 24b.

If utilizing, for instance, the sintering method, then the porous monolithic blocks 24a, 24b may be made by providing an appropriate binder for a sintering method, and the mold 61 whose contour 62 corresponds to the contour 26a, 26b of the first and second sub-enclosure 23a, 23b. Then, the binder and the plurality of particles 51 may be mixed and this mixture may be filled into the mold 61. Then, the mold 61 filled with the mixture of the plurality of particles 51 and the binder is heated in order to produce the relevant porous monolithic block 24a, 24b. During the heating, the binder burns at least partially. For example, two different kinds of binders may be used. One type of binder is a temporary binder which burns during the heating creating the first pores 27. Another type of binder may not burn during the heating. Then, the mold 61 is removed from the porous monolithic block 24a, 24b. Alternatively, the foaming of the plurality of particles 51 can also be achieved by a ceramic foaming method.

If utilizing, for instance, the self-curing binding method, then the porous monolithic blocks 24a, 24b may be made by providing a protein foam as a structuring agent, an appropriate binder, and the mold 61 whose contour 62 corresponds to the contour 26a, 26b of the first and second sub-enclosure 23a, 23b. Then, the protein foam, the binder and the plurality of particles 51 may be mixed and this mixture may be filled into the mold 61. Then, one has to wait until the mixture filled into the mold 61 self-cures in order to produce the relevant porous monolithic block 24a, 24b. Then, the mold 61 is removed from the porous monolithic block 24a, 24b.

Although modifications and changes may be suggested by those skilled in the art, it is the intention of the invention to embody within the patent warranted hereon all changes and modifications as reasonably and properly come within the scope of his contribution to the art.

What is claimed is:

1. A method of manufacturing a loudspeaker, comprising steps of:
   providing a plurality of particles;
   producing at least one porous monolithic block utilizing the plurality of particles; and
   mounting the porous monolithic block into an enclosure,
   wherein producing at least one porous monolithic block utilizing the plurality of particles comprises: providing two different kinds of binders and a mold whose contour corresponds to the contour of the enclosure; mixing the binder and the plurality of particles and filling this mixture into the mold; reducing the ambient pressure around the mold filled with the mixture of the plurality of particles and the binder in order to produce the at least one porous monolithic block; and removing the mold from the at least one porous monolithic block,
   or wherein producing at least one porous monolithic block utilizing the plurality of particles comprises: providing a binder and a mold whose contour corresponds to the contour of the enclosure; mixing the binder and the plurality of particles and filling this mixture into the mold; heating the mold filled with the mixture of the plurality of particles and the binder, wherein one type of binder in the two different kinds of binders burns, and another type of binder in the two different kinds of binders does not burn, in order to produce the at least one porous monolithic block; and
   removing the mold from the at least one porous monolithic block.

2. The method of claim 1, providing a plurality of zeolite particles as the plurality of particles.

3. The method of claim 1, wherein the enclosure comprises a contour, the method further comprising steps of:
   producing the at least one porous monolithic block such that it has a contour corresponding to the contour of the enclosure; and
   mounting the at least one porous monolithic block into the enclosure in a form-fit manner corresponding to the contour of the enclosure.

* * * * *